(12) United States Patent
Miyauchi

(10) Patent No.: US 10,354,162 B2
(45) Date of Patent: Jul. 16, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Takashi Miyauchi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 15/654,591

(22) Filed: Jul. 19, 2017

(65) Prior Publication Data

US 2017/0316275 A1 Nov. 2, 2017

Related U.S. Application Data

(63) Continuation of application No. 15/006,909, filed on Jan. 26, 2016, now Pat. No. 9,740,953.

(30) Foreign Application Priority Data

Jan. 28, 2015 (JP) ................................. 2015-014651

(51) Int. Cl.
*G06K 9/36* (2006.01)
*G06K 9/32* (2006.01)
(Continued)

(52) U.S. Cl.
CPC .......... *G06K 9/3283* (2013.01); *G06T 1/0007* (2013.01); *G06T 5/006* (2013.01);
(Continued)

(58) Field of Classification Search
CPC .. G06K 9/3283; G06K 2009/363; G06T 7/13; G06T 1/0007; G06T 5/006; H04N 1/3878; H04N 5/225; H04N 5/2628
See application file for complete search history.

(56) References Cited

U.S. PATENT DOCUMENTS

| 4,703,321 | A  | * | 10/1987 | Barker  | G06T 11/00 |
|           |    |   |         |         | 345/619    |
| 6,738,154 | B1 | * | 5/2004  | Venable | G06K 9/32  |
|           |    |   |         |         | 358/1.15   |

(Continued)

FOREIGN PATENT DOCUMENTS

| CN | 102592123 A | 7/2012 |
| CN | 102918828 A | 2/2013 |

(Continued)

OTHER PUBLICATIONS

Inkscape: Guide to a Vector Drawing Program, Snapping, Tavmjong Bah, www.https://web.archive.org/web/201501080153/http://tavmjong.free.fr/INKSCAPE/MANUAL/html/Snapping.html, Accessed Aug. 3, 2019.

*Primary Examiner* — Gregory M Desire

(74) *Attorney, Agent, or Firm* — Canon U.S.A., Inc. IP Division

(57) ABSTRACT

A detected quadrilateral area is displayed and no group of candidate lines is displayed in a normal state. While a user is selecting a side that the user desires to change, a group of candidate lines corresponding to the selected side is displayed. Then, whether to replace a position of the selected side with a position of a candidate line is determined based on a movement destination position of the selected side.

8 Claims, 11 Drawing Sheets

(51) Int. Cl.
*G06T 7/13* (2017.01)
*H04N 5/262* (2006.01)
*H04N 1/387* (2006.01)
*H04N 5/225* (2006.01)
*G06T 5/00* (2006.01)
*G06T 1/00* (2006.01)

(52) U.S. Cl.
CPC ............. *G06T 7/13* (2017.01); *H04N 1/3878* (2013.01); *H04N 5/225* (2013.01); *H04N 5/2628* (2013.01); *G06K 2009/363* (2013.01)

(56) References Cited

U.S. PATENT DOCUMENTS

| | | | | |
|---|---|---|---|---|
| 6,772,089 B2 * | 8/2004 | Ikeda | ........................ | G06K 9/48 250/201.2 |
| 7,246,958 B2 * | 7/2007 | Saund | ..................... | H04N 5/77 386/E5.069 |
| 7,499,045 B2 * | 3/2009 | Itoh | ........................ | G06T 11/60 345/418 |
| 8,849,042 B2 * | 9/2014 | Kawatani | ................ | G06K 9/32 382/199 |
| 8,897,565 B1 * | 11/2014 | Palm | .................... | G06K 9/3275 382/176 |
| 9,218,537 B2 * | 12/2015 | Moteki | .............. | G06K 9/00483 |
| 9,495,587 B2 * | 11/2016 | Wilson | ............... | G06K 9/00463 |
| 9,495,735 B2 * | 11/2016 | Wilson | ................. | G06K 9/3283 |
| 2003/0074156 A1 * | 4/2003 | Ikeda | ....................... | G06K 9/48 702/137 |
| 2011/0025860 A1 | 2/2011 | Katougi et al. | | |
| 2011/0228342 A1 | 9/2011 | Dolan | | |
| 2012/0250112 A1 | 10/2012 | Ogawa et al. | | |
| 2015/0067465 A1 * | 3/2015 | Nakasu | ................. | G06F 17/245 715/228 |

FOREIGN PATENT DOCUMENTS

| | | |
|---|---|---|
| GB | 2542666 A | 3/2017 |
| JP | 2009000328 A | 1/2009 |
| JP | 2011123567 A | 6/2011 |
| JP | 2012213101 A | 11/2012 |

* cited by examiner

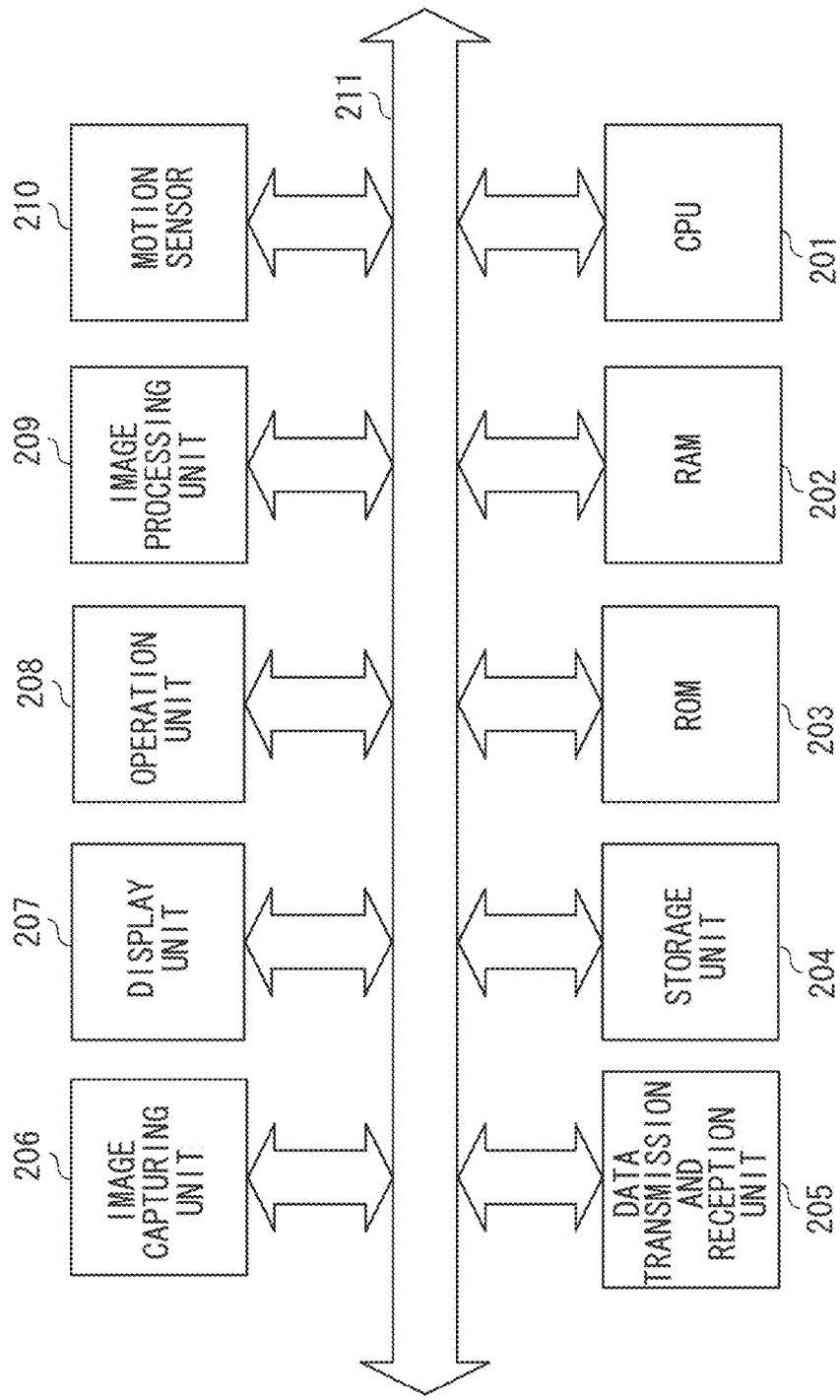

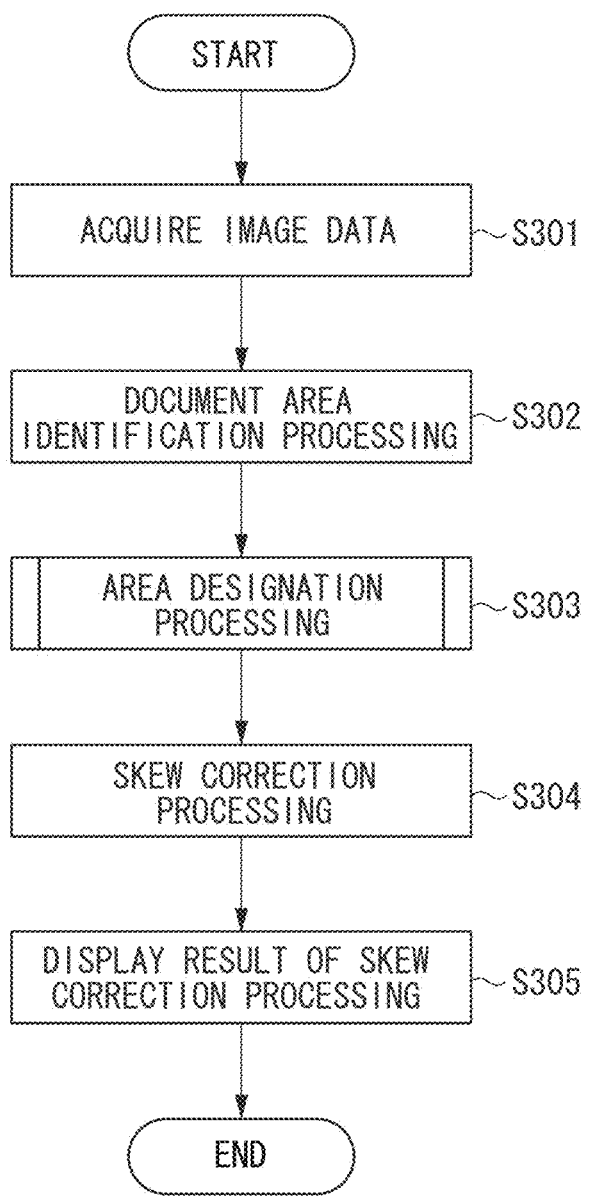

INFORMATION PROCESSING APPARATUS, INFORMATION PROCESSING METHOD, AND STORAGE MEDIUM

The present application is a continuation of U.S. patent application Ser. No. 15/006,909, filed Jan. 26, 2016, entitled, "INFORMATION PROCESSING APPARATUS, INFORMATION PROCESSING METHOD, AND STORAGE MEDIUM" the content of which is expressly incorporated by reference herein in its entirety. Further, the present application claims priority from Japanese Patent Application No. 2015-014651, filed Jan. 28, 2015, which is also hereby incorporated by reference herein in its entirety.

BACKGROUND OF THE INVENTION

Field of the Invention

The present invention relates to an information processing apparatus, an information processing method, and a storage medium configured to store a computer program, for designating an area serving as a reference for extracting a document area extracted from an image and performing skew correction on the resultant document area.

Description of the Related Art

In recent years, mobile terminals having advanced information processing functions such as smartphones and tablet personal computers (PCs) have been widely used. These mobile terminals have a camera and thus have an image capturing function (camera function). Recently, image data representing an image of a document, which is a paper medium, captured with the camera function of the mobile terminal has been stored in a memory of the mobile terminal. Thus, the mobile terminal and a printer have been used in combination more frequently for copying a document. More specifically, image data obtained by capturing an image of the document is transmitted to the printer to be printed. All things considered, the user does not have to have a multifunction peripheral (MFP), having both scanner and printer functions, and only needs the mobile terminal and the printer to copy the document.

However, the image capturing of the document with the camera function of the mobile terminal is different from scanning with the MFP, and it is difficult to capture a frontal image of the document covering the entire captured image with no skew. More specifically, the distance and angel between the camera and the document are difficult to accurately maintain without fixing the mobile terminal and the document, which is a shooting object, by using a mount portion, a tripod, and the like. The captured image thus obtained might include an unwanted object other than the document area or might be geometrically skewed as a result of the image capturing in an oblique direction, and thus should not be directly copied or converted into a data file. Thus, before the captured image is copied or converted into a data file, only a document area needs to be cut out from the captured image to be subjected to skew correction (also referred to as keystone correction in some cases), so that geometrical skew will be corrected.

The document area can be cut out from the captured image, with a smallest possible processing load on the user, by using edge information in the captured image to automatically detect four sides of the document area. However, the automatic detection for the sides of the document area might end in a failure when edges of the sides of the document area cannot be detected due to a low contrast between the document area and a background area, when a correct edge cannot be detected because too many edges other than the four sides of the document area are detected, or in other like cases. Thus, a correct area needs to be designated with a correction operation received from the user, for positions of the four sides of a quadrilateral shape that is a first candidate of the document area displayed on an input image in an overlapping manner.

The quadrilateral area can be designated by the user through a method including setting a handler for the correction operation at each of the vertexes and the midpoint of each side of the quadrilateral shape and receiving the operation through a mouse and a touch operation. With this method, the user can move the vertex and the side to a desired position by operating the handler.

Furthermore, a method has been available in which the user does not directly designate the position of the vertex and the side but selects the position from among candidates that have been obtained by calculation in advance. In Japanese Patent Application Laid-Open No. 2005-303941, a contour is designated by obtaining a plurality of contour candidates, providing the contour candidates one by one in accordance with a key operation performed by the user performing switching among the contour candidates, and causing the user to determine a desired contour. As illustrated in FIG. 6 in Japanese Patent Application Laid-Open No. 2005-303941, the user selects the contour candidate, with one contour candidate, which is a current selection target based on the key operation for switching among the contour candidates, displayed in a bold line, and with all the other contour candidates displayed in dashed lines.

However, in Japanese Patent Application Laid-Open No. 2005-303941, all the contour candidate sides are displayed on an image when the key operation of switching among the contour candidates is performed. Thus, a convoluted image with extremely low visibility is displayed. Furthermore, it is difficult for the user to intuitively select a desired quadrilateral area through the key operation for the switching.

The present invention is directed to a technique in which a user can easily and efficiently designate each side of a quadrilateral area used as a reference for skew correction. More specifically, only when a user selects a side for which the user desires to change a position and an angle, a group of candidate lines is displayed for the selected side so that the user can select a desired side from the group of candidate lines in a displayed screen that is prevented from being convoluted.

SUMMARY OF THE INVENTION

According to an aspect of the present invention, an information processing apparatus includes an identification unit configured to identify a quadrilateral shape determined to be representing four sides of a document area based on a group of candidate lines detected for each side of the document area in an input image, an area designation unit configured to change the quadrilateral shape identified by the identification unit, based on an instruction from a user, and a skew correction unit configured to perform skew correction on the input image based on the quadrilateral shape as a result of the change by the area designation unit. The area designation unit includes a first display unit configured to display the quadrilateral shape identified by the identification unit in such a manner as to be overlapped with the input image, a selection unit configured to select a side of the quadrilateral shape, displayed by the first display unit, based on an instruction from the user, a second display unit configured to display a group of candidate lines for a side selected by the selection unit, a determination unit configured to determine, when a movement instruction for the side selected by the selection unit is received from the user, whether to replace a position of the selected side with a position of one of the group of candidate lines, based on a distance between the position of the side for which the movement has been instructed and the position of the one of the group of candidate lines, and a replacing unit configured to replace the position of the side selected by the selection unit with the position of the one of the group of candidate lines.

While a side for which the position and the angle are desired to be changed is being selected by the user, a group of candidate lines corresponding to the selected side is displayed and a desired side can be selected from the displayed group of candidate lines. Thus, the user can easily recognize whether the candidate lines include the desired line. No group of candidate sides corresponding to unselected sides is displayed, and thus the displayed screen is prevented from being convoluted. In a normal state where the user is selecting none of the sides, no group of candidate sides is displayed and thus the document area can be clearly recognized. The user can select a desired side from the group of candidate sides in accordance with a movement destination position corresponding to an operation of selecting and moving a side, and thus can more intuitively designate the desired side compared with a case where the contour candidates are switched one by one as in Japanese Patent Application Laid-Open No. 2005-303941.

Further features of the present invention will become apparent from the following description of exemplary embodiments with reference to the attached drawings.

BRIEF DESCRIPTION OF THE DRAWINGS

FIG. 2 is a block diagram illustrating a schematic configuration of the mobile terminal according to the first exemplary embodiment.

FIG. 3 is a flowchart illustrating a procedure of processing according to the first exemplary embodiment.

DESCRIPTION OF THE EMBODIMENTS

Exemplary embodiments of the present invention are described below with reference to the drawings.

<Configuration of Mobile Terminal>

Figure 1A:
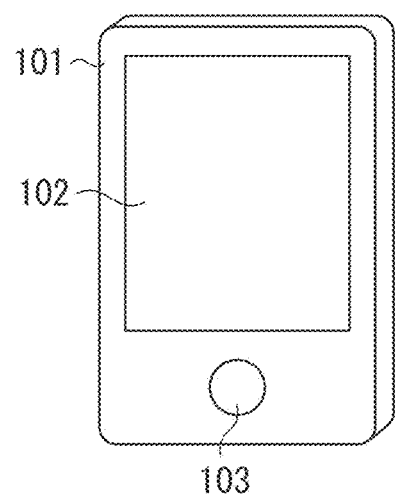
FIGS. 1A and 1B are each an outer view of a mobile terminal according to a first exemplary embodiment.
Figure 1B:
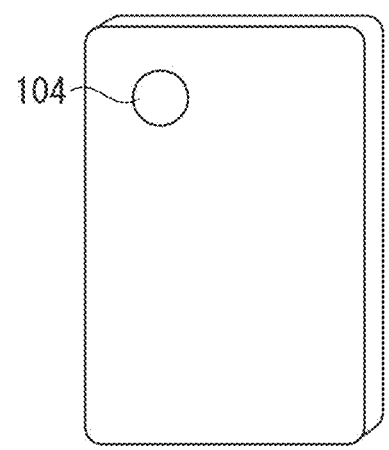

FIGS. 1A and 1B are each an outer view of a mobile terminal (information processing apparatus) 101 used in a first exemplary embodiment. FIG. 1A is an outer view of a front side of the mobile terminal 101 in which a touch panel display 102 and an operation button 103 are disposed. FIG. 1B is an outer view of a back side of the mobile terminal 101 in which a camera 104 is disposed. The camera 104 includes an autofocus mechanism (not illustrated), and thus can measure a focal length and an object distance.

The present exemplary embodiment can be applied to any information processing apparatus having a camera function. For example, processing of the present exemplary embodiment can be implemented by a smartphone (mobile phone), a tablet terminal, and a personal computer (PC) that have the camera function, and can also be implemented in a digital camera having a touch panel display. Furthermore, the processing of the present exemplary embodiment can be implemented in a PC and the like in wired or wireless connection with a camera. The processing of the present exemplary embodiment can be implemented in a mobile terminal, a PC, and the like reading image data stored in a storage device (memory card and the like) storing image data as a result of image capturing by a camera and the like.

FIG. 2 illustrates an internal configuration of the mobile terminal 101. It is to be noted that the diagram illustrates an example of a configuration for implementing the present exemplary embodiment, and thus should not be construed in a limiting sense.

A central processing unit (CPU) 201, a random access memory (RAM) 202, a read only memory (ROM) 203 in FIG. 2 transmit and receive a program and data to and from each other through a data bus 211. A storage unit 204, a data transmission and reception unit 205, an image capturing unit 206, a display unit 207, an operation unit 208, an image processing unit 209, and a motion sensor 210 are connected to the data bus 211. These units as well as the CPU 201, the RAM 202, and the ROM 203 transmit and receive a program and data to and from each other.

The storage unit 204 is a flash memory and stores image data and various programs. The data transmission and reception unit 205 includes a wireless local area network (LAN) controller and transmits and receives data to and from the external.

The image capturing unit 206, which is a camera, captures an image of a document, and thus acquires a captured image. Data of the captured image thus acquired is provided with header information including a manufacturer name, a model name, image resolution, aperture (F number), a focal distance, and the like of the mobile terminal, and is transmitted to each unit as described below.

The display unit 207, which is a display, performs live view displaying when an image of a document is captured with the camera function, and also displays various types of information such as a notification indicating that learning according to the present exemplary embodiment has been completed. The operation unit 208, which is a touch panel, an operation button, and the like, receives an operation from a user and transmits information indicating the operation to each unit.

The image processing unit 209 performs document extraction on the captured image data. The motion sensor 210 has a three-axis accelerometer, an electronic compass, and a three-axis gyro sensor, and can detect an orientation and a movement of the mobile terminal 101 by using a known technique.

The CPU 201 controls the components of the mobile terminal 101 by executing a computer program stored in the ROM 203 or the storage unit 204.

<Detail Description of Present Exemplary Embodiment with Reference to Flowchart>

FIG. 3 is a flowchart illustrating skew correction processing (also referred to as keystone correction processing as appropriate) executed by the mobile terminal 101 in the present exemplary embodiment. The mobile terminal 101 executes the skew correction processing including causing the user to designate a quadrilateral area, serving as a reference for the skew correction, in an input image stored in the ROM 203 or acquired by the image capturing unit 206, and correcting the quadrilateral area so that a rectangular area is obtained. The CPU 201 (computer) loads a processing program, stored in the ROM 203, onto the RAM 202 and executes the processing program, and thus serves as a processing unit that executes processing in each step in FIG. 3.

In step S301, the CPU 201 acquires input image data selected or captured by the user. The selected input image data is acquired as follows. More specifically, image data designated through the operation unit 208 is selected from the image data stored in the ROM 203, a memory card, or the like, and is acquired through the data bus 211. The captured input image data is acquired as follows. More specifically, image data acquired by the image capturing unit 206 is acquired through the data bus 211.

In step S302, the CPU 201 executes document area identification processing of detecting a group of candidate lines (a group of candidate sides), serving as candidates of each sides of the document area, from among the input image data acquired in step S301, and identifying a quadrilateral area representing four sides of the document area based on a first candidate of each side in the group of candidate lines. The document area identification processing is described below in detail with reference to FIG. 4.

Figure 5:
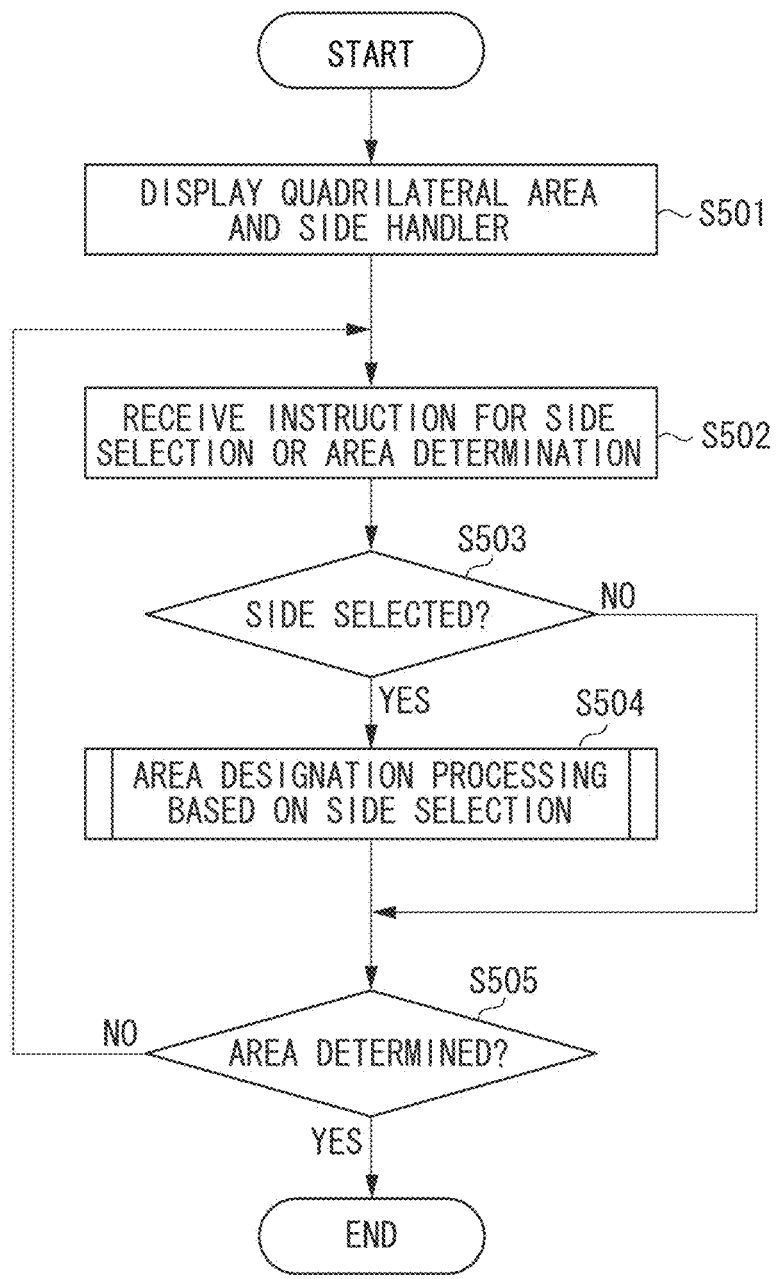
FIG. 5 is a flowchart illustrating a procedure of area designation processing according to the first exemplary embodiment.

In step S303, the CPU 201 executes area designation processing of displaying the quadrilateral area identified in step S302 on the input image data in an overlapping manner, and changing (correcting) the shape of the quadrilateral area based on an instruction for the displayed quadrilateral area from the user. The area designation processing is described in detail below with reference to FIG. 5.

In step S304, the CPU 201 executes skew correction processing including extracting an image of the quadrilateral area in the input image data by using the quadrilateral area designated in step S303 as a reference, and performing skew correction to obtain a rectangular area. The skew correction processing is described in detail later.

In step S305, the CPU 201 displays a skew correction result image, obtained in step S304, on the display unit 207.

<Detail Description of Document Area Identification Processing (S302)>

The document area identification processing is executed by the image processing unit 209 in the present exemplary embodiment. When an image including the document is input, a group of candidate lines serving as candidates of the four sides of the document area is detected and the quadrilateral area representing the four sides of the document area is identified as illustrated in FIG. 4.

Figure 4A:
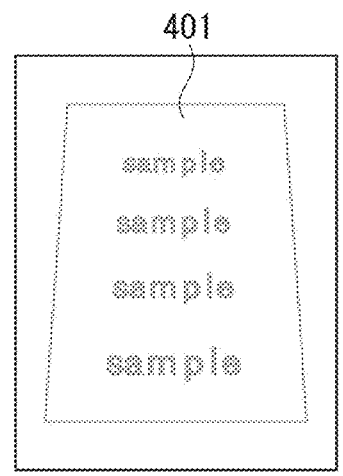
FIGS. 4A, 4B, and 4C are each a diagram illustrating document area identification processing according to the first exemplary embodiment.

FIG. 4A illustrates an input image including a document area 401.

Figure 4B:
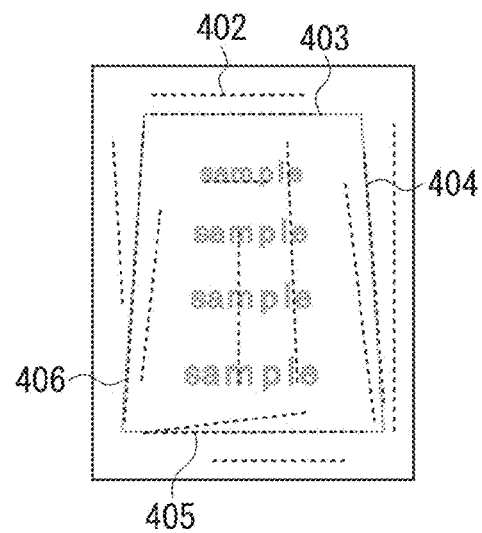

FIG. 4B illustrates an image in which the group of candidate lines are overlapped on the input image. The group of candidate lines is detected through a known method such as a Hough transform algorithm for detecting a straight line through voting edge information detected from the input image, on polar coordinates. The group of candidate lines thus detected includes a line 402 other than those representing the four sides of the document area. Candidate lines 403, 404, 405, and 406 in the group of candidate lines respectively are determined to be most likely to be upper, right, lower, and left sides of the document area. The candidate lines 403, 404, 405, and 406 that each are a first candidate of a corresponding side of the document area are identified in the group of candidate lines detected as described above by evaluating a quadrilateral shape including any four candidate lines. The quadrilateral shape may be evaluated based on geometrical information such as a ratio between lengths of opposite sides, an interior angle, and an aspect ratio, or may be evaluated based on image information. The evaluation based on the image information involves comparison between outer and inner portions of a line forming the quadrilateral shape in tint and variance.

Figure 4C:
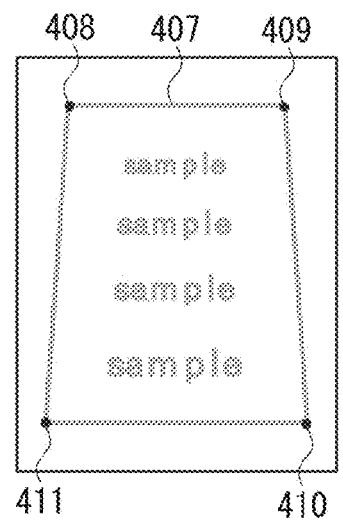

FIG. 4C illustrates an image in which a quadrilateral area 407 that is the document area including the identified ones of the group of candidate lines is displayed on the input image. The quadrilateral area 407 is a quadrilateral area identified with the candidate lines 403, 404, 405, and 406 as the four sides, and is defined by lines connecting between vertexes 408, 409, 410, and 411.

<Detail Description of Area Designation Processing (S303)>

The area designation processing is processing of changing (correcting) the quadrilateral area, serving as a reference for skew correction, based on an instruction from the user. The area designation processing is described in detail with reference to the flowchart illustrated in FIG. 5.

In step S501, the CPU 201 displays the quadrilateral area identified by the document area identification processing and side handlers for receiving an operation from the user, in such a manner as to overlap with the input image displayed on the display unit 207. How the handlers are displayed is described below with reference to FIG. 7.

In step S502, the CPU 201 receives an instruction for side selection or area determination from the user through the operation unit 208. It is assumed that the instruction for side selection has been issued when one side of the quadrilateral shape is selected by selecting a side handler displayed on the display unit 207.

In step S503, the CPU 201 determines whether the instruction for side selection has been issued (whether one side of the quadrilateral shape has been selected based on the instruction from the user) in step S502.

In step S504, the CPU 201 executes area designation processing based on side selection. The area designation processing based on side selection is described below in detail with reference to FIGS. 6 and 7.

In step S505, the CPU 201 determines whether the instruction to determine the area has been issued in step S502. When the instruction to determine the area has been issued (Yes in step S505), the current quadrilateral area is stored and the processing is terminated. On the other hand, when the instruction to determine the area has not been issued (No in step S505), processing returns to step S502 where the CPU 201 again receives an instruction from the user.

<Detail Description of Area Designation Processing Based on Side Selection (S504)>

The area designation processing based on side selection is processing of modifying the quadrilateral area through an instruction from the user, when the side has been selected.

Figure 6:
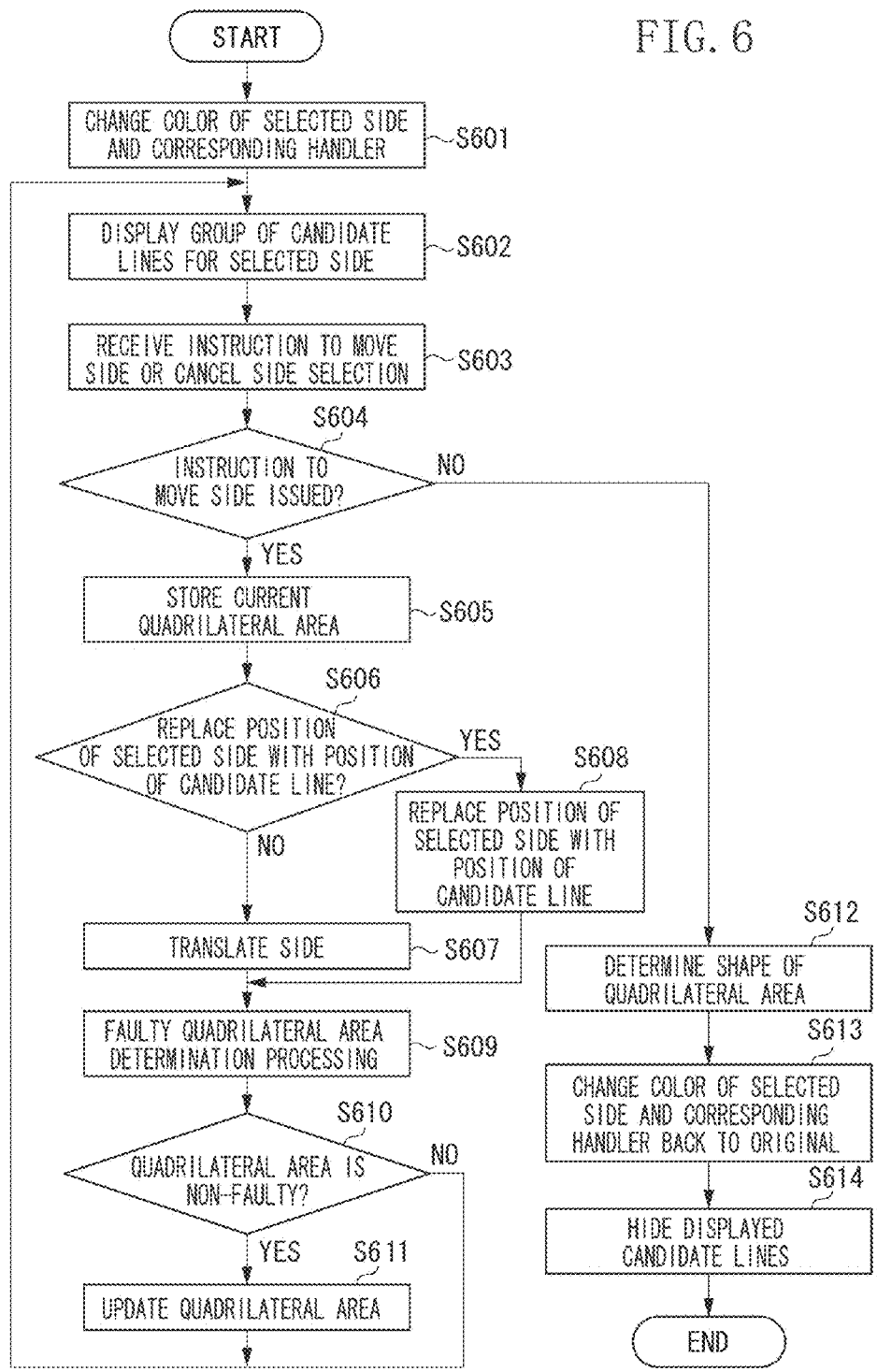
FIG. 6 is a flowchart illustrating a procedure of area designation processing based on side selection according to the first exemplary embodiment.

FIG. 7 is a schematic view illustrating the area designation processing based on side selection. FIG. 7A illustrates a quadrilateral area 701, side handlers 702, 703, 704, and 705 used for side selection, and vertex handlers 706, 707, 708, and 709 used for vertex selection. In the figure, the side handlers 702, 703, 704, and 705 each are a circular handler disposed at a midpoint position of the corresponding side. However, the shape and the position of a side handler are not limited to these, and a side itself may be selected as a handler. FIG. 6 is a flowchart illustrating the area designation processing based on side selection. The area designation processing based on side selection with the handler is described with reference to a flowchart illustrated in FIG. 6 and to FIGS. 7A to 7D.

Figure 7A:
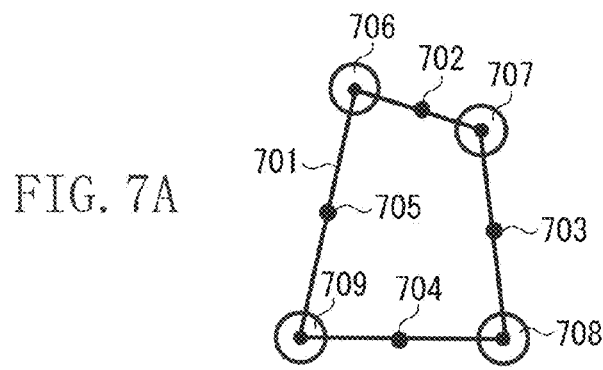
FIGS. 7A, 7B, 7C, and 7D are each a diagram illustrating the area designation processing based on side selection according to the first exemplary embodiment.
Figure 7B:
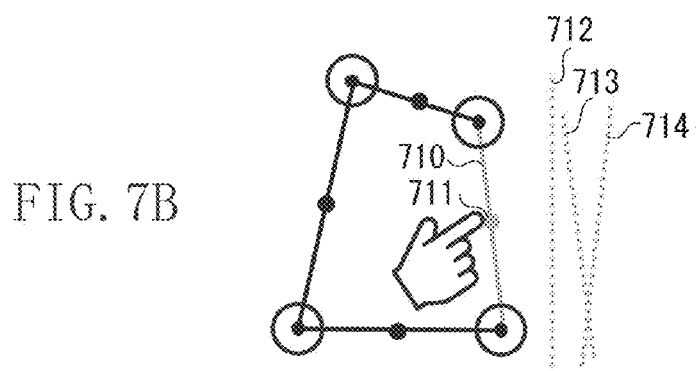

In step S601, when the user touches and thus selects the side handler (or the side itself), the CPU 201 changes the color of the selected side and the handler to be displayed. Thus, the user can recognize the selected side. FIG. 7B illustrates a case where the side handler 711 of the side 710 is selected and thus, the color of the side 710 and the side handler 711 is changed.

In step S602, the CPU 201 displays a group of candidate sides for the selected side. The group of candidate sides for the selected side is obtained by extracting only candidate lines for the selected side from the group of candidate lines detected in the document area identification processing. Thus, the user can easily recognize whether the group of candidate sides include a desired line. The group of candidate sides is displayed only when a side is selected, whereby the visibility can be prevented from degrading in a state where no side is selected. The group of candidate sides is extracted by using geometrical information on the length, the angle, the position, and the like of the selected side. FIG. 7B illustrates a case where the side 710 is selected with lines 712, 713, and 714 serving as the group of candidate sides. The group of candidate sides 712, 713, and 714 is displayed with a color and a form (for example, a dashed line) that are different from those of the quadrilateral area 701 and the selected side 710, and thus can be distinguished from the quadrilateral area 701 and the selected side 710.

In step S603, the CPU 201 receives an instruction to move the side or cancel the side selection from the user. It is assumed that the instruction to move the side is issued when the position of the side handler is changed by the user. More specifically, for example, it is determined that the position is changed when the user slides a position of his or her finger touching the side. It is assumed that the instruction to cancel the side selection is issued when the selection of the side handler is canceled. More specifically, for example, it is determined that the selection is canceled when the user moves his or her finger touching the side away from the screen.

In step S604, the CPU 201 determines whether the instruction issued by the user in step S603 is the instruction to move the side.

In step S605, the CPU 201 temporarily stores the quadrilateral area before the modification is applied, in the memory.

In step S606, the CPU 201 determines whether to move the selected side to a position of the candidate line at the position closest to the current position of the moving side handler (whether the position replacing is to be performed). In FIG. 7B, this determination is made on the line 712 at the position closest to the side handler 711. Whether the replacing is to be performed is determined based on geometrical information such as a distance between a movement destination position of the selected side handler (designated movement position) and the candidate line serving as the determination target, the difference between the selected side and the candidate line serving as the determination target in the length and the angle, and the like. For example, the position of the selected side is determined to be positioned on (replaced with) the position of the line as the determination target, when the distance between the position after the movement of the handler and the line serving as the determination target is reduced to or below a predetermined threshold.

Figure 7C:
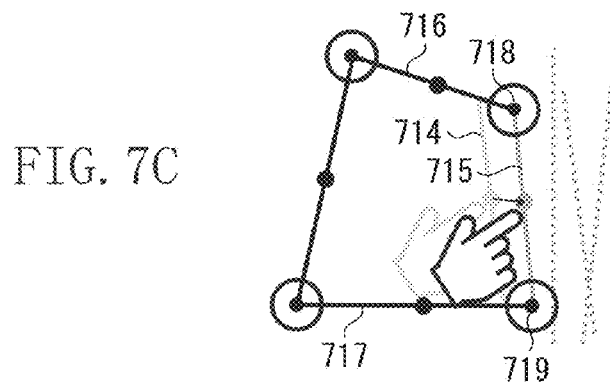

When the CPU 201 determines not to replace the selected side with the candidate line in step S606 (No in step S606), the processing proceeds to step S607 where the selected side is translated to the position instructed by the user in step S603. FIG. 7C illustrates a state where the side 714 has been moved to be a side 715. The selected side 714 is moved, without having the inclination angle changed, between the sides 716 and 717 that are two sides adjacent to the side 714 in accordance with the movement of the side handler. The modified quadrilateral area can be obtained with an intersecting point 718, between the extension of the side 716 and the side after the movement, and an intersecting point 719, between the extension of the side 717 and the side after the movement, serving as new vertexes.

Figure 7D:
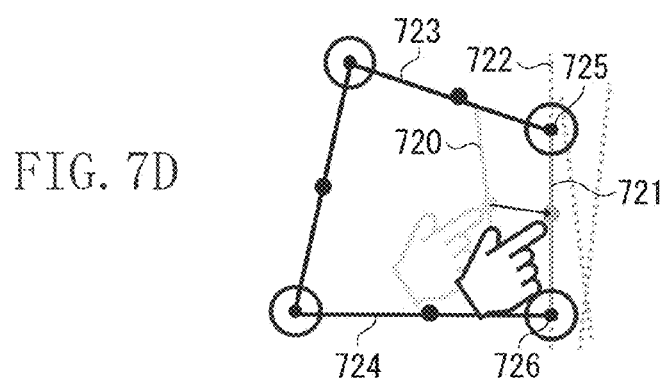

When the CPU 201 determines to replace the selected side with the candidate line in step S606 (Yes in step S606), the processing proceeds to step S608 where the CPU 201 moves the position of the selected side to be aligned with the position of the candidate line serving as the determination target to display the position of the selected side. Thus, only through an operation of moving the selected side toward a displayed candidate line, the user can move the selected line to the position of the destination line if the distance between the selected line and the candidate line drops to or below the predetermined threshold. Thus, when the group of candidate sides includes the lines representing the four sides of the document area, the user can easily designate the correct sides of the document area. FIG. 7D illustrates a state where a side 720 has been moved toward a candidate side 722 and then the position and the inclination of the side 720 are replaced with the position and the inclination of the candidate side 722, at a point where it is determined that the distance between the side 720 and the candidate side 722 has dropped to or below the predetermined threshold. The side 721 as a result of the replacement can be obtained by obtaining the intersecting point between the line 722 and each of two sides 723 and 724 adjacent to the selected side 718.

In step S609, the CPU 201 determines whether the quadrilateral area obtained in step S607 or S608 is faulty, based on the distance between the vertexes of the modified quadrilateral area as well as the positions and interior angles of the vertexes. For example, a quadrilateral shape with the vertexes that are too close to each other may be determined to be faulty based on a distance between vertexes determined by setting the smallest size of the document in the captured image and a displayed size of the vertex handler not impairing the operability and the visibility. Alternatively, the determination may be based on vertex position so that a quadrilateral shape not having all the vertexes in an image display area can be determined to be faulty, or based on an inner angle so that a quadrilateral shape that would never be obtained even when an image of the document is captured in an oblique direction can be determined to be faulty.

In step S610, the CPU 201 determines the processing to be executed next based on the determination result obtained in step S609. Thus, when the quadrilateral area is determined to be faulty in step S609, the current quadrilateral area is not updated with the quadrilateral area obtained in step S607 or S608, and thus the modification instruction from the user is unaccepted.

When the CPU 201 determines that the quadrilateral area is not faulty in the processing in step S609 (Yes in step S610), the processing proceeds to step S611 where the CPU 201 updates the current quadrilateral area with the quadrilateral area obtained in step S607 or S608, and thus the modification instruction from the user is applied.

When the CPU 201 determines that the user has issued the instruction to cancel the side selection in step S603 (No in step S604), the CPU 201 determines the shape of the quadrilateral area in step S612. For example, whether the shape of the quadrilateral area is a protruding quadrilateral area may be determined based on the interior angle, or whether the opposite sides intersect may be determined.

In step S613, the CPU 201 changes the color of the selected side and the corresponding handler back to original. Thus, the user can recognize that the side selection has been canceled.

In step S614, the CPU 201 hides the displayed candidate lines. Thus, when the user cancels the side selection, only the quadrilateral area and the handlers as illustrated in FIG. 7A are displayed on the display screen in such a manner as to overlap with the input image. All things considered, the quadrilateral area can be checked with no visibility degradation.

<Detail Description of Skew Correction Processing>

Figure 8A:
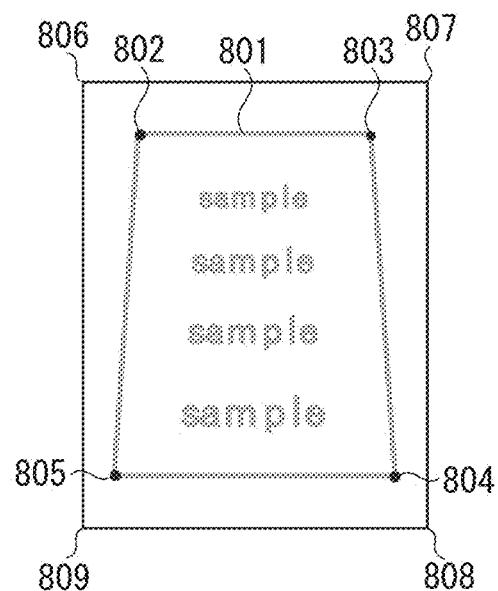
FIGS. 8A and 8B are each a diagram illustrating skew correction processing according to the first exemplary embodiment.
Figure 8B:
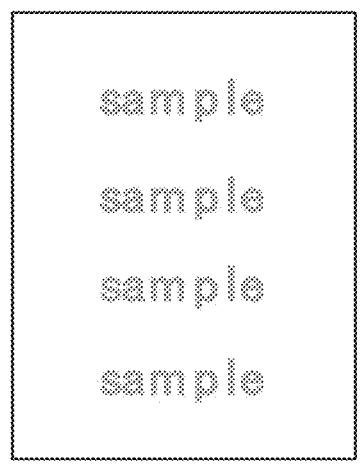

The following processing is executed by the image processing unit 209 in the present exemplary embodiment. The skew correction processing is executed with the quadrilateral area, obtained from the input image including the document through the document area identification processing and the area designation processing, used as a reference. FIG. 8A illustrates a quadrilateral area 801 obtained as a result of the area designation processing. The image processing unit 209 calculates a magnification parameter based on the size of the document in the captured image. Here, with the calculated magnification parameter, the quadrilateral area in the captured image is set to have an output image size. The magnification parameter is a projective transformation matrix so that a trapezoidal skewing can be corrected. The projective transformation matrix can be calculated through a known method with vertex information (vertexes 802, 803, 804, and 805) of the quadrilateral area in the input image and coordinate information on four corners (806, 807, 808, and 809) of an output image. Alternatively, an affine transformation matrix or a simple magnification ratio may be calculated as the magnification parameter when a processing speed is the main priority. Once the magnification parameter is determined, the image processing unit 209 executes magnification processing only on the quadrilateral area in the input image. Thus, an image as a result of extracting only the quadrilateral area from the input image can be obtained. FIG. 8B illustrates an image as an image output as a result of the skew correction processing.

In the present exemplary embodiment described above, only when a side is being selected, the group of candidate sides for the selected side is displayed. Thus, the user can easily recognize whether the candidates include the desired side without making the screen display in a normal state convoluted. A side can be selected from among the group of candidate sides in accordance with the position of the handler on a selected and operated side. Thus, the quadrilateral area can be more easily and efficiently designated compared with a case where the vertex position is manually designated.

In the first exemplary embodiment, the side handler for moving a side is used by the user for issuing the modification instruction, in area designation processing. In a second exemplary embodiment, the modification instruction is received not only with the side handler but also with a vertex handler for moving a vertex. Thus, the position of the vertex can be freely changed, whereby the quadrilateral area desired by the user can be extracted even when the group of candidate lines does not include the line desired by the user.

In the present exemplary embodiment, only parts of the area designation processing and the area designation processing based on vertex selection different from those of the first exemplary embodiment are described.

<Detail Description of Area Designation Processing>

Figure 9:
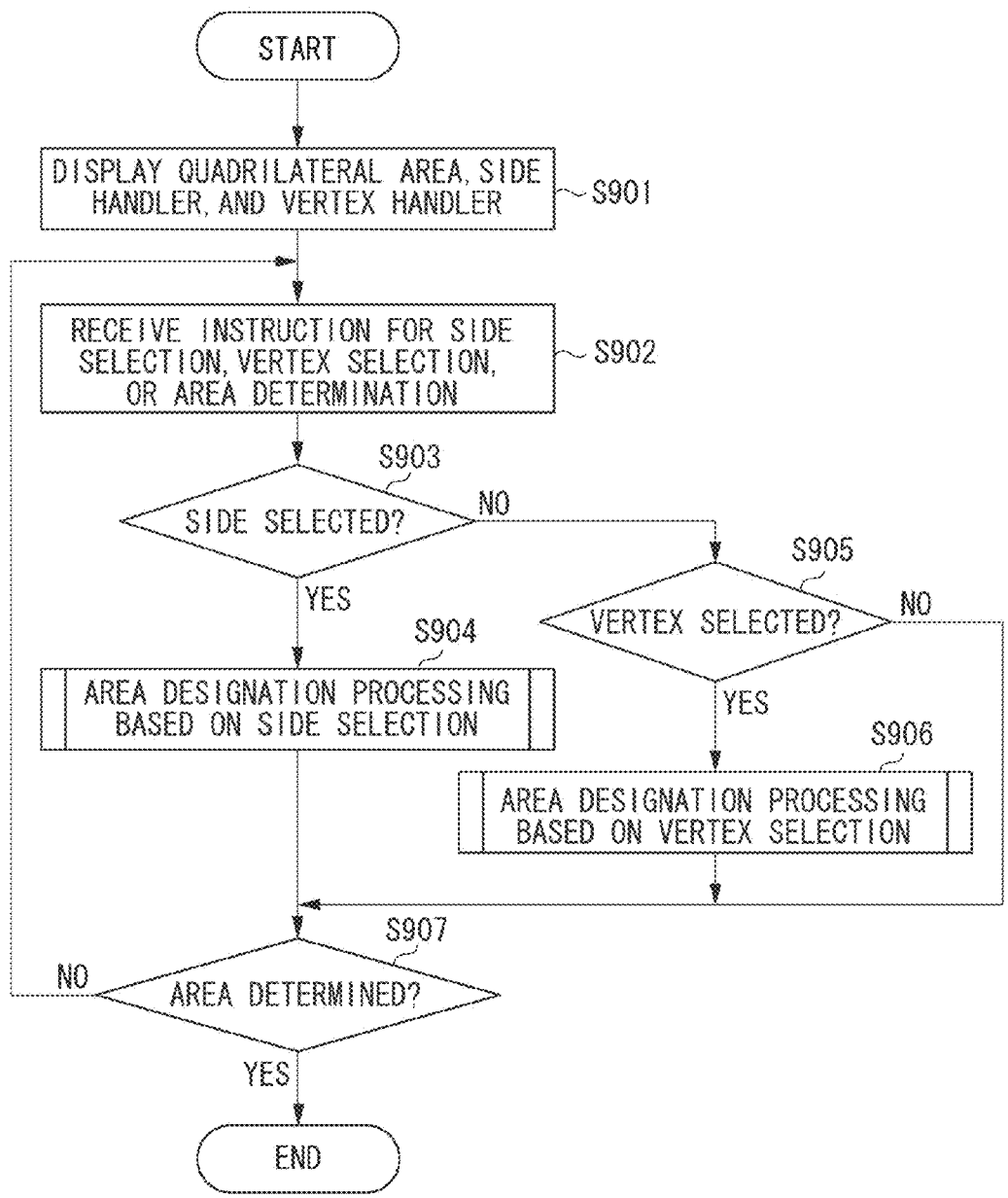
FIG. 9 is a flowchart illustrating a procedure of area designation processing according to a second exemplary embodiment.
Figure 10:
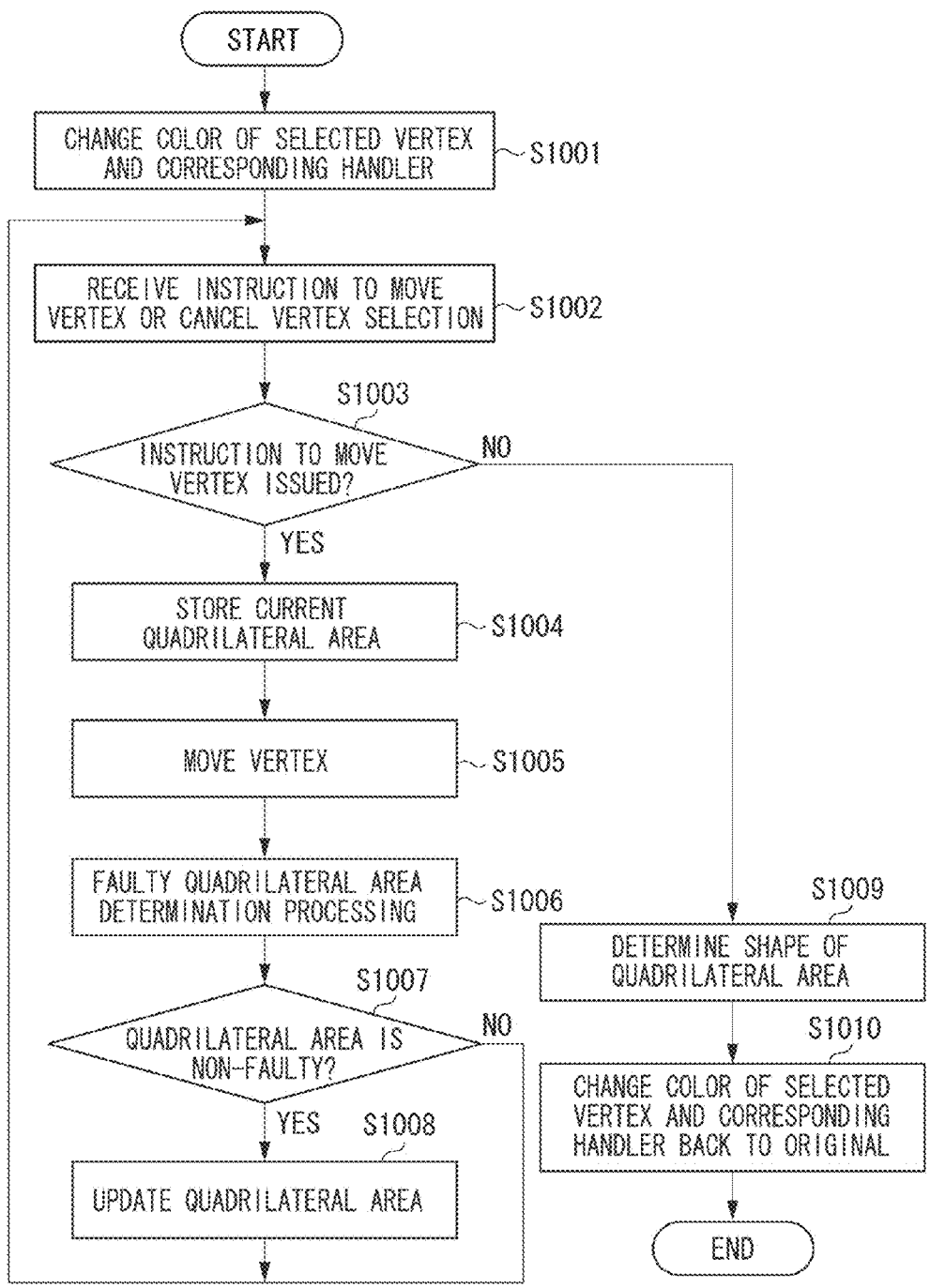
FIG. 10 is a flowchart illustrating a procedure of area designation processing based on vertex selection according to the second exemplary embodiment.

Area designation processing according to the present exemplary embodiment is described in detail below with reference to a flowchart in FIG. 9.

In step S901, the CPU 201 displays the quadrilateral area identified through the document area identification processing as well as the side handlers and vertex handlers for receiving an operation from the user in such a manner as to overlap with the input image displayed on the display unit 207.

In step S902, the CPU 201 receives an instruction for side selection, vertex selection, or area determination from the user through the operation unit 208. The instruction for the side selection is issued when the handler on the side displayed on the display unit 207 is selected, and that the instruction for the vertex selection is issued when the handler on the vertex displayed on the display unit 207 is selected.

In step S903, the CPU 201 determines whether the instruction for the side selection has been issued in step S902. When the CPU 201 determines that the instruction for side selection has been issued (Yes in step S902), the processing proceeds to step S904 where the CPU 201 executes the area designation processing based on side selection in the same manner as the first exemplary embodiment.

In step S905, the CPU 201 determines whether the instruction for the vertex selection has been issued in step S902. When the CPU 291 determines that the instruction for the vertex selection has been issued, the processing proceeds to step S906 where the CPU 201 executes the area designation processing based on vertex selection. The area designation processing based on vertex selection is described below with reference to FIG. 10 and FIGS. 11A to 11C.

In step S907, the CPU 201 determines whether the instruction for area determination has been issued in step S902. When the CPU 201 determines that the instruction for area determination has been issued (Yes in step S907), the current quadrilateral area is stored and the processing is terminated. When the CPU 201 determines that the instruction for area determination has not been issued (No in step S907), the processing proceeds to step S902 where the CPU 201 again receives an instruction from the user.

<Detail Description of Area Designation Processing Based on Vertex Selection (S906)>

The area designation processing based on vertex selection is processing of modifying the quadrilateral area in accordance with an instruction from the user, in a state where a vertex is selected.

Figure 11A:
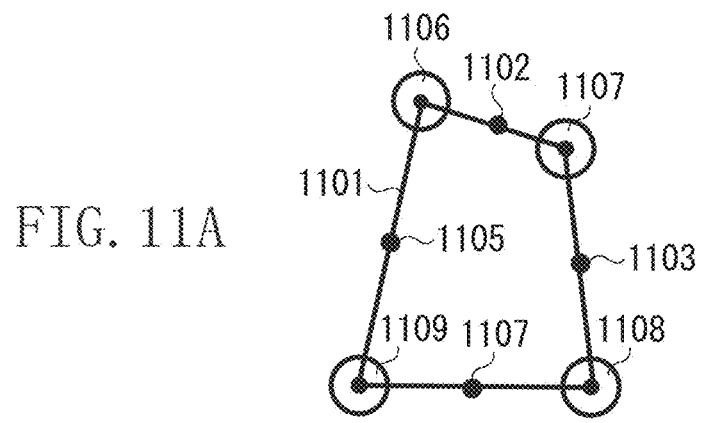
FIGS. 11A, 11B, and 11C are each a diagram illustrating the area designation processing based on vertex selection according to the second exemplary embodiment.
Figure 11B:
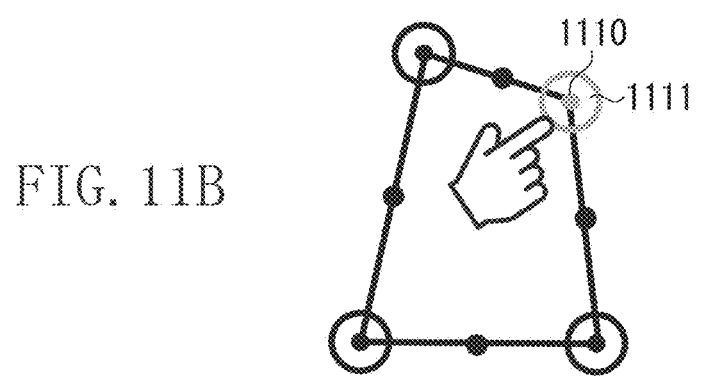
Figure 11C:
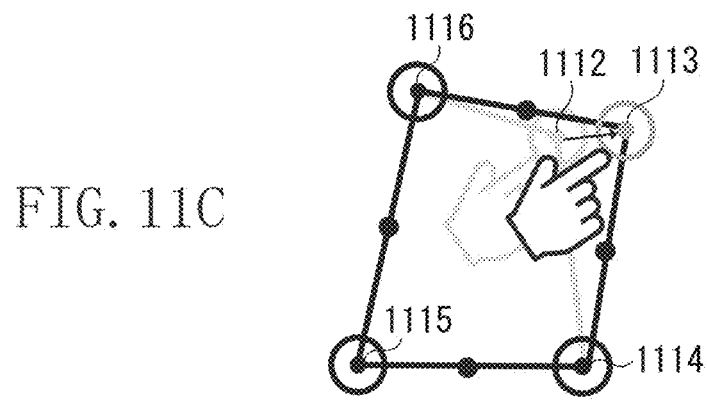

FIGS. 11A to 11C are each a schematic view illustrating the area designation processing based on vertex selection. FIG. 11A illustrates a quadrilateral area 1101, side handlers 1102, 1103, 1104 and 1105 used for side selection, and vertex handlers 1106, 1107, 1108, and 1109 for vertex selection. Here, the vertex handlers 1106, 1107, 1108, and 1109 are each illustrated as a circle with a position of the corresponding vertex as the center. An inner portion of the circle is transparently or semi-transparently displayed so that the input image can be seen through. Thus, the user can easily move the vertex of the quadrilateral area, and the vertex of the quadrilateral area can be easily to be positioned at the corner of the document in the input image, while checking the input image. The shape of the vertex handler is not limited to this. The area designation processing based on vertex selection is described in detail with reference to a flowchart in FIG. 10 and FIGS. 11A to 11C.

In step S1001, the CPU 201 changes the color of the selected vertex and the corresponding handler. Thus, the user can recognize the currently selected vertex. FIG. 11B illustrates a case where a vertex handler 1111 at a vertex 1110 has been selected.

In step S1002, the CPU 201 receives an instruction to move the vertex or to cancel the vertex selection from the user. The CPU 201 determines that the instruction to move the vertex has been issued when the user changes the position of the vertex handler. The CPU 201 determines that the instruction to cancel the vertex selection has been issued when the selection of the vertex handler is canceled.

In step S1003, the CPU 201 determines whether the user has issued the instruction to move the vertex in step S1002.

In step S1004, the CPU 201 temporarily stores the quadrilateral area, before the modification is applied, in the memory.

In step S1005, the CPU 201 moves the selected vertex to the position designated by the user in step S1002. FIG. 11C illustrates a state where a vertex 1112 has been moved to a vertex 1113. Here, vertexes 1114, 1115, and 1116 that have not been selected remains unmoved. The quadrilateral area defined by lines connecting between the vertexes 1113, 1114, 1115, and 1116 is the modified quadrilateral area.

In step S1006, the CPU 201 determines whether the quadrilateral area, obtained in step S1005, is faulty, based on the modified quadrilateral area. For example, the determination is made based on the distance between the vertexes so that the quadrilateral area with the vertexes disposed too close to each other is determined to be faulty, and based on the vertex position so that the quadrilateral area with a vertex disposed outside the display image area is determined to be faulty. By use of the determination, the quadrilateral area can be prevented from being faulty.

In step S1007, the CPU 201 determines the next processing to be executed based on the determination result obtained in step S1006. Thus, when the quadrilateral area is determined to be faulty, the current quadrilateral area is not updated with the quadrilateral area obtained in step S1005, whereby the modification instruction from the user is unaccepted.

When the CPU 201 determines that the quadrilateral area is not faulty (Yes in step S1006), the processing proceeds to step S1008 where the CPU 201 changes (updates) the current quadrilateral area to the quadrilateral area obtained in step S1005, whereby the modification instruction from the user is applied.

When the CPU 201 determines that the instruction for canceling the vertex selection has been issued by the user in step S1003 (No in step S1003), the processing proceeds to step S1009 where the CPU 201 determines the shape of the quadrilateral area. For example, whether the shape of the quadrilateral area is a protruding quadrilateral area may be determined based on the interior angle, or whether the opposite sides intersect may be determined.

In step S1010, the CPU 201 changes the color of the selected vertex and the corresponding handler back to original. Thus, the user can recognize that the vertex selection has been canceled.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
a memory; and
a processor in communication with the memory, the processor being configured to perform operations comprising:
detecting a plurality of lines which are candidates for an edge of a rectangle that is included in an input image;
displaying, on a display, a rectangle constructed by the edge, which is determined as a side of the rectangle among the detected candidates for the edge; and
replacing according to a movement instruction for moving a position of a side selected from sides of the displayed rectangle, the position of the selected side with a position of an edge selected from the candidates for the edge,
wherein, a rectangle constructed to include the side of which the position is replaced with the position of the selected edge is displayed on the display.

2. The information processing apparatus according to claim 1, wherein the candidates for the edge are to be detected for each side of the rectangle.

3. The information processing apparatus according to claim 1, wherein the replacing replaces the displayed edge with the another edge, which is determined based on a direction of position movement indicated by the movement instruction among the candidates for the edge.

4. The information processing apparatus according to claim 1, wherein the displaying displays, on a screen, the edge for which the movement instruction for the position movement is received, in a display form different from a display form in which another side of the rectangle is displayed.

5. The information processing apparatus according to claim 1, wherein the operations further comprise:
   determining whether the replacing replaces the displayed edge with an edge different from the displayed edge,
   wherein in a case where it is determined that the replacing does not replace the displayed edge, the displayed edge is moved parallel based on the movement instruction.

6. The information processing apparatus according to claim 1, wherein the operations further comprising correcting the rectangle displayed on the display.

7. An information processing method comprising:
   detecting a plurality of lines which are candidates for an edge of a rectangle that is included in an input image;
   displaying, on a display, a rectangle constructed by the edge, which is determined as a side of the rectangle among the detected candidates for the edge; and
   replacing according to a movement instruction for moving a position of a side selected from sides of the displayed rectangle, the position of the selected side with a position of an edge selected from the candidates for the edge,
   wherein a rectangle constructed to include the side of which the position is replaced with the position of the selected edge is displayed on the display.

8. A non-transitory computer readable storage medium configured to store a computer program for causing a processor to execute:
   detecting a plurality of lines which are candidates for an edge of a rectangle that is included in an input image;
   displaying, on a display, a rectangle constructed by the edge, which is determined as a side of the rectangle among the detected candidates for the edge; and
   replacing according to a movement instruction for moving a position of a side selected from sides of the displayed rectangle, the position of the selected side with a position of an edge selected from the candidates for the edge,
   wherein a rectangle constructed to include the side of which the position is replaced with the position of the selected edge is displayed on the display.

\* \* \* \* \*